United States Patent
Roh et al.

(10) Patent No.: US 7,319,718 B2
(45) Date of Patent: Jan. 15, 2008

(54) CQI CODING METHOD FOR HS-DPCCH

(75) Inventors: Dong Wook Roh, Seoul (KR); Min Seok Oh, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 1086 days.

(21) Appl. No.: 10/365,498

(22) Filed: Feb. 13, 2003

(65) Prior Publication Data

US 2003/0174669 A1 Sep. 18, 2003

(30) Foreign Application Priority Data

Feb. 16, 2002 (KR) ........................ 10-2002-0008350

(51) Int. Cl.
*H04B 17/00* (2006.01)
(52) U.S. Cl. .................. 375/224; 375/240; 375/261; 370/442; 370/491; 370/328; 455/69; 455/452.2; 714/769; 714/755
(58) Field of Classification Search ................. 370/442, 370/491, 328; 455/69, 452, 452.2; 375/224, 375/240, 261; 714/769, 755
See application file for complete search history.

(56) References Cited

U.S. PATENT DOCUMENTS

| | | | | |
|---|---|---|---|---|
| 2002/0141436 A1* | 10/2002 | Toskala | ...................... | 370/442 |
| 2003/0157900 A1* | 8/2003 | Gaal et al. | ...................... | 455/69 |
| 2003/0185242 A1* | 10/2003 | Lee et al. | ................... | 370/491 |
| 2004/0058687 A1* | 3/2004 | Kim et al. | ................ | 455/452.2 |

FOREIGN PATENT DOCUMENTS

| EP | 1 248 485 A1 | 10/2002 |
|---|---|---|
| EP | 1 289 167 A1 | 3/2003 |
| KR | 1020020039121 | 5/2002 |
| KR | 1020020062471 | 7/2002 |
| KR | 1020030035293 | 5/2003 |
| KR | 1020030035605 | 5/2003 |

OTHER PUBLICATIONS

3GPP TS 25.222; Version 5.3.0 Release 5; Dec. 2002.
3GPP TS 25.212; Version 5.0.0 Release 5; Mar. 2002.
3GPP TS 25.212; Version 2.3.0; Oct. 1999.
Ericsson, "Coding for Channel-Quality-Related Information," 3GPP TSG-RAN #22, Nov. 19-23, 2001, Cheju, Korea, R1-01-1144.
LG Electronics Inc., "Uplink QI Signaling with Error-Detection Capability," TSG-RAN Working Group 1 #22, Nov. 19-23, 2001, Jeju, Korea, Tdoc R1-01-1135.
Samsung, "Coding Scheme for Quality Indicator (rev. 1)," 3GPP TSG-RAN 1 #22, Nov. 22-23, 2001, Jeju, Korea, R1-01-1324.
Philips, "Performance Requirements for Channel Quality Signalling," TSG RAN WG1 #22, Nov. 19-23, 2001, Jeju, South Korea, TSGR1(01)1204.
Philips, "Coding of Channel Quality Information," 3GPP TSG RAN WG1 #23, Jan. 8-11, 2002, Espoo, Finland, Tdoc R1-02-0046.
Japanese Office Action dated Sep. 5, 2006.

* cited by examiner

*Primary Examiner*—Chieh M. Fan
*Assistant Examiner*—Eva Zheng
(74) *Attorney, Agent, or Firm*—KED & Associates, LLP (57) ABSTRACT

In the channel quality information (CQI) coding method of the present invention, first basis sequences for generating sub-codes of 32 bits are created, and second basis sequences for generating codewords of 20 bits are created using the first basis sequences, the second basis sequence maximizing system throughput such that five information bits are coded into CQI code using the second basis sequences. Also, since HSDPA system has been designed in order to increase the system throughput, the CQI coding method of the present invention, which shows the best system throughput in the simulation, can be the optimum CQI coding scheme for HS-DPCCH.

28 Claims, 6 Drawing Sheets

FIG.1

PRIOR ART

| Puncturing pattern | Used basis |
|---|---|
| 2, 4, 5, 6, 8, 9, 10, 11, 12, 13, 14, 30 | $M_{0,I}, M_{1,I}, M_{2,I}, M_{3,I}, M_{4,I}$ |

| Puncturing pattern | Repetition pattern | Used basis |
|---|---|---|
| 0, 2, 4, 5, 6, 8, 9, 10, 11, 12, 13, 14, 30 | 31 | $M_{0,1}, M_{1,1}, M_{2,1}, M_{3,1}, M_{4,1}$ |

| Puncturing pattern | Repetition pattern | Used basis |
|---|---|---|
| 0, 1, 2, 4, 5, 6, 8, 9, 10, 11, 12, 13, 14, 30 | 31, 31 | $M_{0,i}, M_{1,i}, M_{2,i}, M_{3,i}, M_{4,i}$ |

| Puncturing pattern | Repetition pattern | Used basis |
|---|---|---|
| 0, 1, 2, 3, 4, 5, 6, 7, 8, 9, 10, 11, 12, 13, 14, 30 | 31, 31, 31, 31 | $M_{0,I}, M_{1,I}, M_{2,I}, M_{3,I}, M_{4,I}$ |

CQI CODING METHOD FOR HS-DPCCH

BACKGROUND OF THE INVENTION

1. Field of the Invention

The present invention relates to a wireless communication system and, more particularly, to a reliable uplink channel quality information (CQI) coding method for HS-DPCCH in HSDPA system for 3GPP.

2. Description of the Background Art

The UMTS (Universal Mobile Telecommunications System) is the third generation mobile communication system evolved from a GSM (Global System for Mobile Communications) and a European style mobile communication standard. It is intended to provide improved mobile communication services on the basis of a GSM core network (CN) and a Wideband Code Division Multiple Access (WCDMA) access technology.

For the purpose of making a standard for third generation mobile communication systems (IMT-2000 systems) based on evolved GSM core network and WCDMA radio access technology, a group of standard developing organizations including ETSI of Europe, ARIB/TTC of Japan, T1 of U.S., and TTA of Korea established the Third Generation Partnership Project (3GPP).

For the purpose of efficient management and technological development, five Technical Specification Groups (TSGs) are organized under 3GPP in consideration of network construction factors and their operations.

Each TSG is in charge of approving, developing and managing specifications related to a pertinent area. Among them, RAN (Radio Access Network) group has developed functions, requirements and interface specifications related to UE (User Equipment) and UMTS terrestrial radio access network (UTRAN) in order to set a new radio access network specification to the third generation mobile communication system.

The TSG-RAN group consists of one plenary group and four working groups.

WG1 (Working Group 1) has been developing specifications for a physical layer (Layer 1), and WG2 has been specifying functions of a data link layer (Layer 2) between UE and UTRAN. In addition, WG3 has been developing specifications for interfaces among Node Bs (the Node B is a kind of base station in the wireless communications), Radio Network Controllers (RNCs) and the core network. Lastly, WG4 has been discussing requirements for radio link performance and radio resource management.

Figure 1:
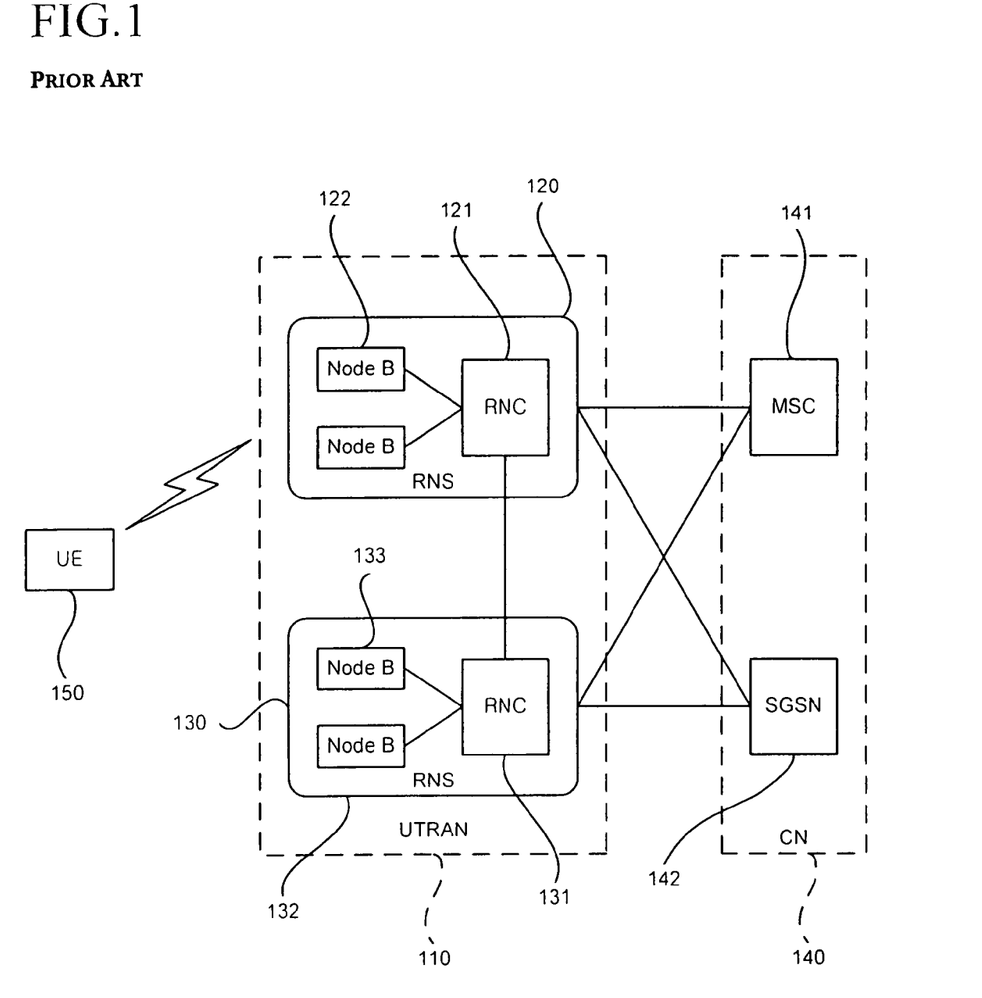
FIG. 1 is a conceptual view showing a structure of the UMTS radio access network (UTRAN)

FIG. 1 illustrates a structure of the UTRAN defined in 3GPP.

As depicted in FIG. 1, the UTRAN 110 includes at least one or more radio network sub-systems (RNSs) 120 and 130, and each RNS includes one RNC and at least one or more Node Bs. For example, Node B 122 is managed by RNC 121, and receives information transmitted from the physical layer of the UE 150 through an uplink channel and transmits a data to the UE 150 through a downlink channel.

Accordingly, the Node B is considered to work as an access point of the UTRAN from the UE point of view.

The RNCs 121 and 131 perform functions of allocation and management of radio resources of the UMTS and are connected to a suitable core network element depending on types of services provided to users.

For example, the RNCs 121 and 131 are connected to a mobile switching center (MSC) 141 for a circuit-switched communication such as a voice call service, and are connected to a SGSN (Serving GPRS Support Node) 142 for a packet switched communication such as a radio Internet service.

The RNC in charge of a direct management of the Node B is called a Control RNC (CRNC) and the CRNC manages common radio resources.

On the other hand, the RNC that manages dedicated radio resources for a specific UE is called a Serving RNC (SRNC). Basically, the CRNC and the SRNC can be co-located in the same physical node. However, if the UE has been moved to an area of a new RNC that is different from SRNC, the CRNC and the SRNC may be located at physically different places.

There is an interface that can operate as a communication path between various network elements. The interface between a Node B and a RNC is called a Iub interface, and an interface between RNCs is called an Iur interface. And an interface between the RNC and the core network is called an Iu.

High Speed Data Packet Access (HSDPA) is standardization work within the 3GPP for realizing high speed, high-quality wireless data packet services. To support HSDPA, various advanced technologies such as Adaptive Modulation and Coding (AMC), Hybrid Automatic Repeat Request (HARQ), Fast Cell Selection (FCS), Multiple Input Multiple Out (MIMO), and etc. are introduced.

Well known are the benefits of adapting the transmission parameters in a wireless system to the changing channel conditions. The process of modifying the transmission parameters to compensate for the variations in channel condition is known as link adaptation (LA) and AMC is one of the link adaptation techniques. The principle of AMC is to change the modulation and coding scheme according to variations in the channel conditions, subject to system restrictions. That channel conditions can be estimated based on feedback from the UE. In a system with AMC, the UEs in favorable positions, i.e., close to the cell site, are typically assigned higher order modulation with higher code rate (e.g. 64 QAM with R=¾ Turbo Code), while UEs in unfavorable positions, i.e., close to the cell boundary, are assigned lower order modulation with lower code rate (e.g. QPSK with R=½ Turbo Code). The main benefits of AMC are the higher data rate available for UEs in favorable positions which in turn increases the average throughput of the cell and the reduced interference variation due to link adaptation based on variations in the modulation/coding scheme instead of variations in transmit power.

In conventional ARQ, ARQ process should be performed along up to the upper layer of the UE and the node B, while in the HSDPA, ARQ process is conducted within the physical layer. The key characteristic of the HARQ is to transmit the un-transmitted portion of the encoded block when the NACK (No Acknowledgement) is received from the receiver, which enables the receiver to combine each portion of received codewords into the new codewords with the lower coding rate so as to obtain much coding gain. Another feature of the n-channel HARQ is that a plurality of packets can be transmitted on n channels even when an ACK/NACK (Acknowledgement/No acknowledgement) is not received unlike in the typically Stop and Wait ARQ which allows the node B to transmit the next packet only when the ACK signal is received from the receiver or to retransmit the previous packet when the NACK signal is received. In other words, the node B of HSDPA can transmit a plurality of next packets successively even if it does not receive the ACK/NACK for the previous transmitted packet, thereby increasing channel usage efficiency. Combining AMC and HARQ leads to maximize transmission efficiency-AMC provides the coarse data rate selection, while HARQ provides fine data rate adjustment based on channel conditions.

FCS is conceptually similar to Site Selection Diversity Transmission (SSDT). Using FCS, the UE indicates the best cell which should serve it on the downlink, through uplink signaling. Thus while multiple cells may be members of the active set, only one of them transmits at a certain time, potentially decreasing interference and increasing system capacity. Determination of the best cell may not only be based on radio propagation conditions but also available resources such as power and code space for the cells in the active set.

MIMO is one of the diversity techniques based on the use of multiple downlink transmit/receiver antennas. MIMO processing employs multiple antennas at both the base station transmitter and terminal receiver, providing several advantages over transmit diversity techniques with multiple antennas only at the transmitter and over conventional single antenna systems.

Due to the introductions of these new schemes, new control signals are configured between the UE and the node B in HSDPA. HS-DPCCH is a modification to UL DPCCH for supporting HSDPA.

Figure 2:
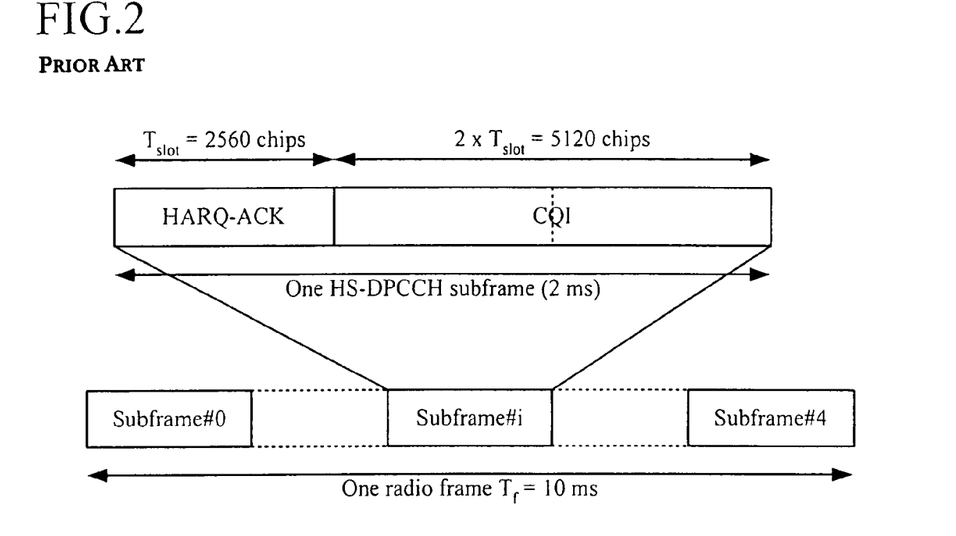
FIG. 2 is a drawing illustrating a frame structure for uplink HS-DPCCH associated with HS-DSCH transmission.

FIG. 2 shows a frame structure for uplink HS-DPCCH associated with HS-DSCH transmission. The HS-DPCCH carries uplink feedback signaling consisted of HARQ-ACK/NACK and channel-quality indicator (CQI). Each subframe of length 2 ms (3×2560 chips) consists of 3 slots, each of length 2560 chips. The HARQ-ACK/NACK is carried in the first slot of the HS-DPCCH subframe and the CQI is carried in the second and third slot of the HS-DPCCH subframe. There is at most one HS-DPCCH on each radio link and the HS-DPCCH can only exist together with an uplink DPCCH.

Figure 3A:
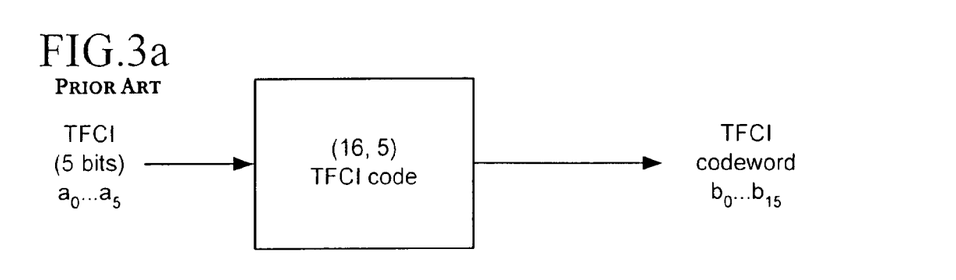
FIG. 3a is a schematic block diagram illustrating a (16, 5) TFCI encoder.

To support fast link adaptation, the UE is to provide node B with information about the downlink channel quality, i.e., CQI. Regarding the channel coding for HS-DPCCH CQI, a number of uplink CQI coding methods have been proposed and most proposals assume that the CQI is to be coded into 20 channel bits. The CQI coding methods are based on the Transmit Format Combination Indicator (TFCI) coding method of 3GPP specification. FIG. 3a shows a (16, 5) TFCI encoder, which is similar to the (32, 10) TFCI encoder in FIG. 3b except that five information bits are used so as to generate (16, 5) TFCI codeword. The basis sequences for (16, 5) TFCI code are shown in table 1a and the basis sequences for (32, 10) TFCI code are illustrated in table 1b.

Detailed methods of generating TFCI codeword are revisited below. First, (16, 5) TFCI encoding method is described. In table 1a, let the TFCI information bits $a_0, a_1, a_2, a_3, a_4$, and $M_{i,n}$ a basis sequence for n-th TFCI information bit. Then output codeword bits $b_i$ are given by $$b_i = \sum_{n=0}^{4} (a_n \times M_{i,n}) \bmod 2 \text{ where } i = 0, 1, 2, \ldots 15$$

The output bits are denoted by $b_i$, i=0, 1, 2, ... 15.

Figure 3B:
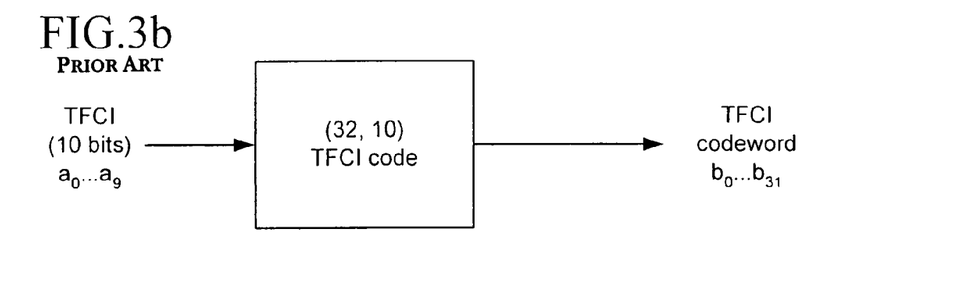
FIG. 3b is a schematic block diagram illustrating a (32, 10) TFCI encoder.

In a similar manner, the generation of (32, 10) TFCI codeword can be defined. In table 1b, let the TFCI information bits $a_0, a_1, a_2, a_3, a_4, a_5, a_6, a_7, a_8, a_9$ and $M_{i,n}$ a basis sequence for n-th TFCI information bit. Then output codeword bits $b_i$ are given by $$b_i = \sum_{n=0}^{9} (a_n \times M_{i,n}) \bmod 2 \text{ where } i = 0, 1, 2, \ldots 31$$

The output bits are denoted by $b_i$, i=0, 1, 2, ... 31.

The basis sequences for (16, 5) TFCI in Table 1a are included in the basis sequences for (32, 10) TFCI in Table 1b if the information bits are limited to the first 5 bits and the some 16 output bits are selected from 32 output bits. The common part between two basis sequences is highlighted by shadow in table 1b. The CQI coding method is based on the conventional TFCI coding method. The CQI requires 5 information bits and 20 coded bits, i.e. (20, 5) CQI code. Therefore, the (16, 5) TFCI code and (32, 10) TFCI coding method should be modified to fit the required number of bits for CQI coding. The (16, 5) TFCI code should be extended to (20, 5) CQI code by adding each basis sequence by 4 bits. The (32, 10) TFCI code can be used to generate (20, 5) CQI code through two steps. First, the (32, 10) TFCI code should be expurgated to the (32, 5) modified TFCI code by deleting last 5 basis sequences. Hereinafter the (32, 5) modified TFCI code by deleting last 5 basis sequences is referred to (32, 5) expurgated TFCI code. Secondly, the (32, 5) expurgated TFCI code should be punctured and repeated to meet the (20, 5) CQI code. The basis sequences for the (32, 5) expurgated TFCI code are as follows in table 1c. The common part of basis sequences between (16, 5) TFCI code and (32, 5) expurgated TFCI code is shadowed. The table 1c also include the basis sequences for (16, 5) TFCI code, i.e. table 1a. It means that the generating method based on the (32, 10) TFCI code can be represented by another form of generating method based on the (16, 5) TFCI code, vice versa.

TABLE 1a

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |

TABLE 1b

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

TABLE 1c

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 0 |
| 1 | 0 | 1 | 0 | 0 | 0 |
| 2 | 1 | 1 | 0 | 0 | 0 |
| 3 | 0 | 0 | 1 | 0 | 0 |
| 4 | 1 | 0 | 1 | 0 | 0 |
| 5 | 0 | 1 | 1 | 0 | 0 |
| 6 | 1 | 1 | 1 | 0 | 0 |
| 7 | 0 | 0 | 0 | 1 | 0 |
| 8 | 1 | 0 | 0 | 1 | 0 |
| 9 | 0 | 1 | 0 | 1 | 0 |
| 10 | 1 | 1 | 0 | 1 | 0 |
| 11 | 0 | 0 | 1 | 1 | 0 |
| 12 | 1 | 0 | 1 | 1 | 0 |
| 13 | 0 | 1 | 1 | 1 | 0 |
| 14 | 1 | 1 | 1 | 1 | 0 |
| 15 | 1 | 0 | 0 | 0 | 1 |
| 16 | 0 | 1 | 0 | 0 | 1 |
| 17 | 1 | 1 | 0 | 0 | 1 |
| 18 | 0 | 0 | 1 | 0 | 1 |
| 19 | 1 | 0 | 1 | 0 | 1 |
| 20 | 0 | 1 | 1 | 0 | 1 |
| 21 | 1 | 1 | 1 | 0 | 1 |
| 22 | 0 | 0 | 0 | 1 | 1 |
| 23 | 1 | 0 | 0 | 1 | 1 |
| 24 | 0 | 1 | 0 | 1 | 1 |
| 25 | 1 | 1 | 0 | 1 | 1 |
| 26 | 0 | 0 | 1 | 1 | 1 |
| 27 | 1 | 0 | 1 | 1 | 1 |
| 28 | 0 | 1 | 1 | 1 | 1 |
| 29 | 1 | 1 | 1 | 1 | 1 |
| 30 | 0 | 0 | 0 | 0 | 0 |
| 31 | 0 | 0 | 0 | 0 | 1 |

Figure 4:
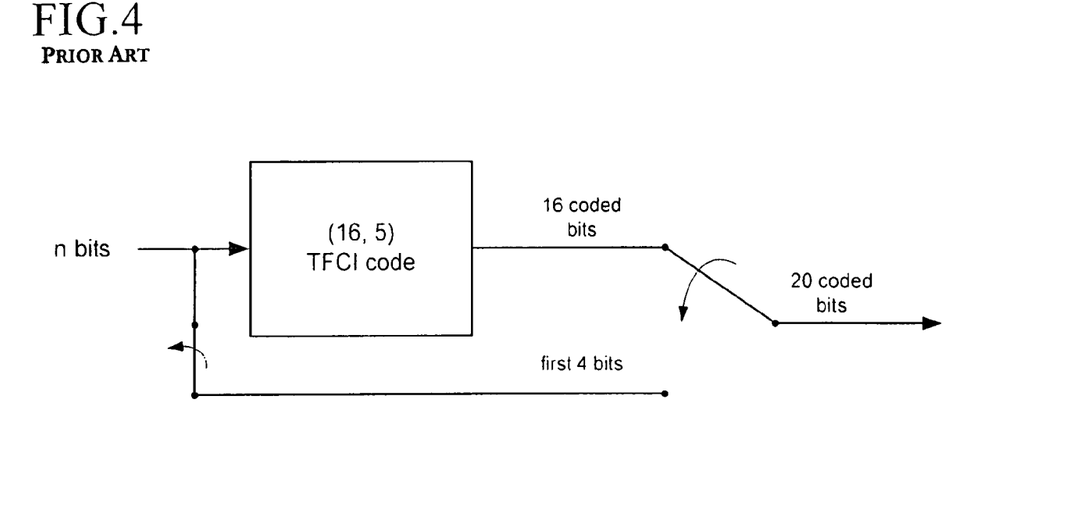
FIG. 4 is a schematic block diagram illustrating an encoder for generating a conventional (20, 5) CQI code based on the (16, 5) TFCI code.

FIG. 4 illustrates an encoder for generating an extended (16, 5) TFCI code. In FIG. 4, (16, 5) TFCI code, is reused with each codeword extended with the four least reliable information bits for (20, 5) CQI code. This CQI coding scheme is designed so as to have the optimal minimum distance.

Figure 5A:
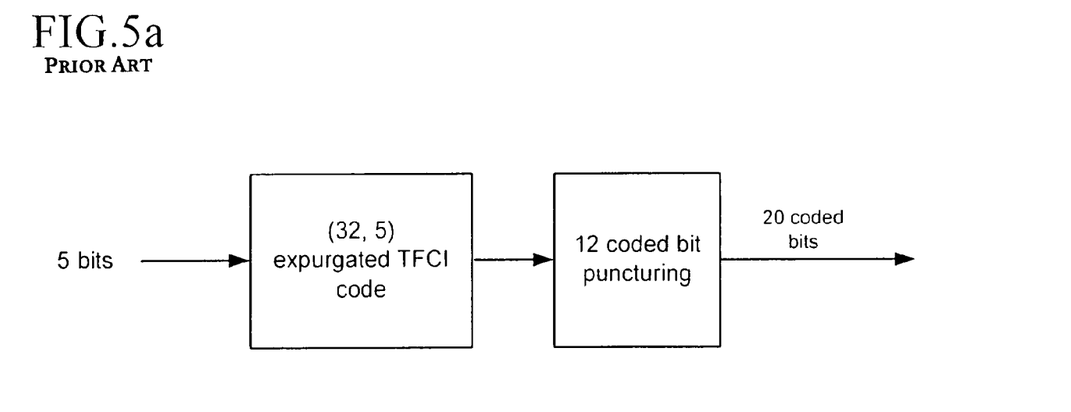
FIG. 5a is a schematic block diagram illustrating an encoder for generating conventional (20, 5) CQI code based on the expurgated (32, 5) TFCI code.

FIG. 5*a* illustrates an encoder for generating punctured (32, 5) expurgated TFCI code. In this CQI coding scheme, (32, 5) expurgated TFCI code with puncturing 12 symbols is proposed. The puncturing pattern and used basis sequences are as in FIG. 5*b*.

Figure 5B:
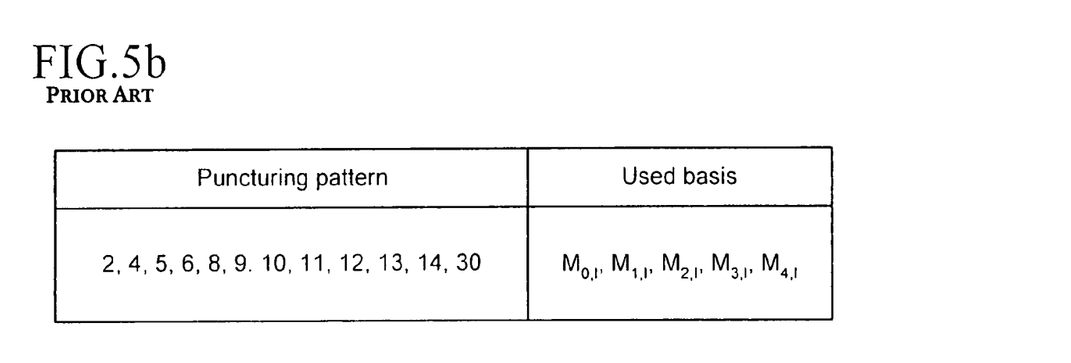

However, (20, 5) CQI coding schemes using the extended (16, 5) TFCI code in FIG. 4 and the punctured (32, 5) expurgated TFCI code in FIG. 5 are equivalent to each other. That is because the resultant basis sequences based on the (16, 5) TFCI code are the same as the resultant punctured basis sequences based on the (32, 5) expurgated TFCI code after puncturing. The only difference is the order of codeword bits. However, since the difference of bit position doesn't have any effect on the coding performances and properties, both coding schemes of FIG. 4 and FIG. 5 are equivalent each other.

Since the (20, 5) CQI coding scheme based on the (16, 5) TFCI code can be expressed as that based on the (32, 5) expurgated TFCI code, vice versa, the extended (16, 5) TFCI code and the punctured (32, 5) expurgated TFCI code are commonly expressed as the basis sequences in table 2. It means that the (20, 5) CQI coding scheme based on both the (16, 5) TFCI and (32, 5) expurgated TFCI code is to decide what the basis sequence pattern is in the blank in table 2. Hereinafter, the basis sequence part which is the same as 3GPP technical specifications will be omitted for convenience.

TABLE 2

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| . | . | . | . | . | . |
| . | . | . | . | . | . |
| . | . | . | . | . | . |
| 14 | 1 | 1 | 1 | 1 | 1 |
| 15 | 0 | 0 | 0 | 0 | 1 |
| 16 | To be filled with the extended patterns in the embodiments | | | | |
| 17 | | | | | |
| 18 | | | | | |
| 19 | | | | | |
| 20 | | | | | |

Figure 6:
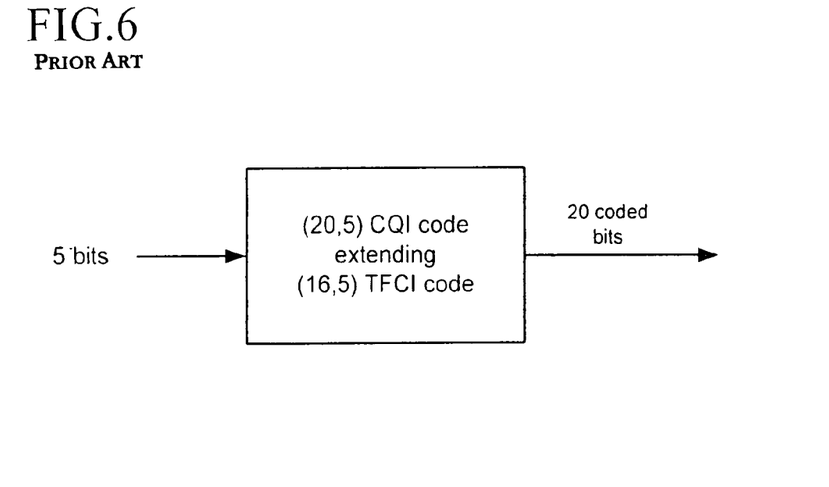
FIG. 6 a schematic block diagram illustrating another encoder for generating (20, 5) CQI code by extending (16, 5) TFCI code.

FIG. 6 illustrates another encoder for generating extended (16, 5) TFCI code. In order to extend from (16, 5) to (20, 5), the basis sequence is extended and the extended parts are filled as in table 3.

TABLE 3

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| . | . | . | . | . | . |
| . | . | . | . | . | . |
| . | . | . | . | . | . |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 1 | 0 |

Here $M_{i,4}$ is the most significant bit (MOB). This arrangement gives significant extra protection to the MOB, and a little more robustness to the next most significant bit.

The conventional CQI coding schemes and their performances are varied according to the extended parts of basis sequence table. In this approach, to select optimum CQI coding scheme means just to find optimum extended part of the basis sequence table.

The above CQI coding schemes are developed in consideration of BER performance and unequal error protection (RMS error reduction) but system throughput. However, the coding schemes have tradeoffs between BER and unequal error protection. In other words, in view of the BER performance the first and second CQI coding schemes are superior to that of the third one. On the other hand, in view of the unequal error protection the third CQI coding scheme is superior to those of the first and second ones.

However, since HSDPA system has been designed in order to increase the system throughput, it is desirable to use the system throughput as one of the criteria in order to select optimum CQI coding scheme.

SUMMARY OF THE INVENTION

The present invention has been made in an effort to solve the above problem.

It is an object of the present invention to provide a method for generating basis sequences for CQI coding capable of maximizing a system throughput.

To achieve the object, in one aspect of the present invention the channel quality information (CQI) coding method comprises (a) creating first basis sequences for generating (32, 5) expurgated TFCI code from (32, 10) TFCI code, (b) puncturing each of the (32, 5) expurgated TFCI codes in a predetermined bit pattern in order to maximize system throughput, (c) repeating a predetermined bit of each (32, 5) expurgated TFCI code for predetermined times in order to maximize system throughput, and (d) encoding 5 information bits into CQI codes using a second basis sequences generated through (b) and (c).

Each (32, 5) expurgated TFCI code is punctured as many as 16 bits in order of 0, 1, 2, 3, 4, 5, 6, 7, 8, 9, 10, 11, 12, 13, 14, and $30^{th}$ bits, and a $31^{st}$ bit of the (32, 5) expurgated TFCI code is repeated 4 times.

The first basis sequences are already shown in table 1c.

The second basis sequences are as in following table:

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 | where i=0, . . . , 19.

In other aspect of the present invention the channel quality information (CQI) coding method comprises inputting 5 information bits, generating 32 bit sub-codes with the information bits using a basis sequences, generating 20 bit codewords by puncturing 16 bits from each of the sub-codes in a predetermined bit pattern and repeating a predetermined bit of the sub-code.

The sub-codes are punctured 16 bits in order of 0, 1, 2, 3, 4, 5, 6, 7, 8, 9, 10, 11, 12, 13, 14, and $30^{th}$ bits and $31^{st}$ bit is repeated 4 times.

The resultant basis sequences are represented by $M_{i,0}$=10101010101010100000, $M_{i,1}$=01100110011001100000, $M_{i,2}$=00011110000111100000, $M_{i,3}$=00000001111111100000, and $M_{i,4}$=11111111111111111111, where i=0, . . . , 19.

In other aspect of the present invention the channel quality information (CQI) coding method comprises (a) obtaining first basis sequences from (16, 5) TFCI code, (b) extending basis sequences to (20, 5) CQI code in a predetermined pattern in order to maximize system throughput, (c) encoding 5 information bits into CQI codes using a second basis sequences generated through (a) and (b). The second extended basis sequences are the same as the upper table.

In other aspect of the present invention the channel quality information (CQI) coding method comprises (a) encoding 5 information bits into (16, 5) TFCI codes using (16, 5) TFCI basis sequences (b) repeating the MOB of information bits 4 times in order to maximize system throughput.

BRIEF DESCRIPTION OF THE DRAWINGS

The invention will be described in detail with reference to the following drawings in which like reference numerals refer to like elements wherein:

FIG. 5b is a table showing a puncturing pattern and used basis adapted to the encoder of FIG. 5a;

FIG. 7b is a table showing a puncturing pattern, repetition pattern, and used basis adapted to the encoder of FIG. 7a;

FIG. 9b is a table showing a puncturing pattern, repetition pattern, and used basis adapted to the encoder of FIG. 9a.

DETAILED DESCRIPTION OF THE PREFERRED EMBODIMENTS

Preferred embodiments of the present invention will be described with reference to the accompanying drawings hereinafter.

Figure 7A:
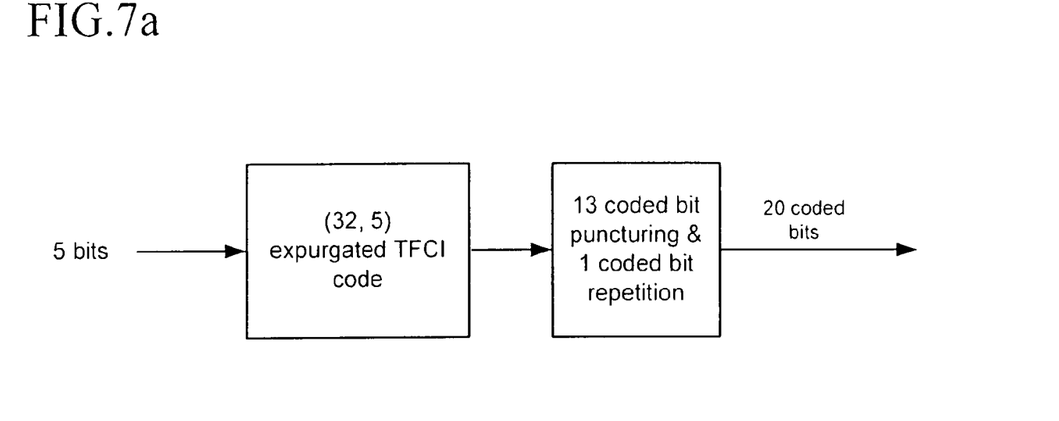
FIG. 7a is a schematic block diagram illustrating an encoder for generating (20, 5) CQI code according to a first embodiment of the present invention.
Figure 7B:
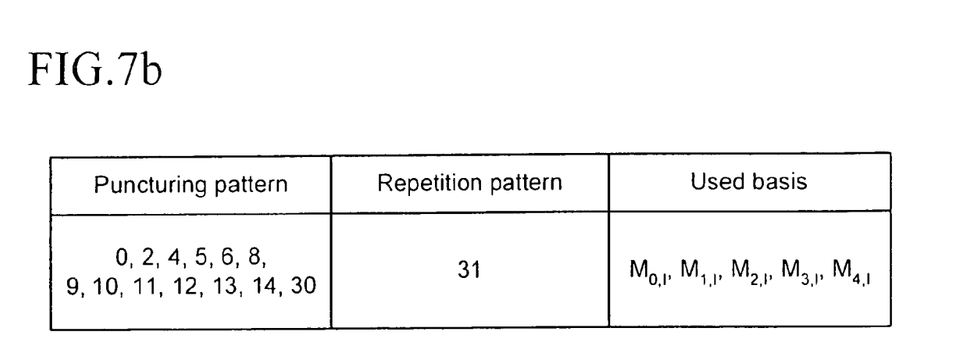

FIG. 7a is a block diagram illustrating an encoder for generating (20, 5) code according to a first embodiment of the present invention and FIG. 7b is a table for illustrating how the encoder of FIG. 7a generate the (20, 5) code.

Referring to FIG. 7a and FIG. 7b, once 5 information bits are inputted, the encoder linearly combines the information bits with basis sequences so as to generate a (32, 5) expurgated TFCI code. The expurgated TFCI code of 32 bit length is punctured by 13 bits in a puncturing pattern (0, 2, 4, 5, 6, 8, 9, 10, 11, 12, 13, 14, and $30^{th}$ bits) and the $31^{st}$ bit is repeated one time such that the code word of 20 bit length is obtained. The basis sequences are $M_{i,0}$, $M_{i,1}$, $M_{i,2}$, $M_{i,3}$, $M_{i,4}$. The basis sequences generated according to the first embodiment are as following in table 4. In other aspect of the first embodiment is to construct basis sequences by extending from (16, 5) TFCI code to the basis sequence of table 4.

TABLE 4

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| . | . | . | . | . | . |
| . | . | . | . | . | . |
| . | . | . | . | . | . |
| 15 | 0 | 0 | 0 | 0 | 1 |
| 16 | 0 | 0 | 0 | 0 | 1 |
| 17 | 0 | 0 | 0 | 1 | 0 |
| 18 | 0 | 0 | 1 | 0 | 0 |
| 19 | 0 | 1 | 0 | 0 | 0 |

Each of the basis sequences according to the first embodiment can be expressed as follows:
$M_{i,0}$=10101010101010100000
$M_{i,1}$=01100110011001100001
$M_{i,2}$=00011110000111100010
$M_{i,3}$=00000001111111100100
$M_{i,4}$=11111111111111111000

Figure 8A:
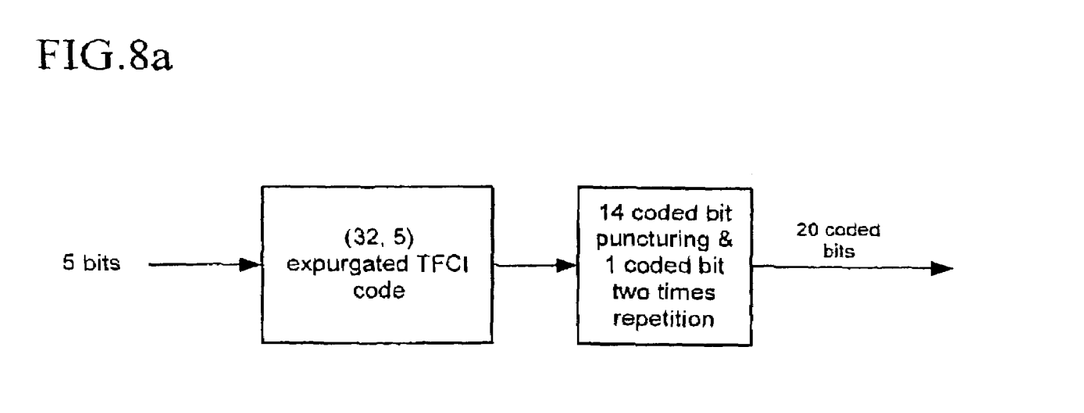
FIG. 8a is a schematic block diagram illustrating an encoder for generating (20, 5) CQI code according to a second embodiment of the present invention.
Figure 8B:
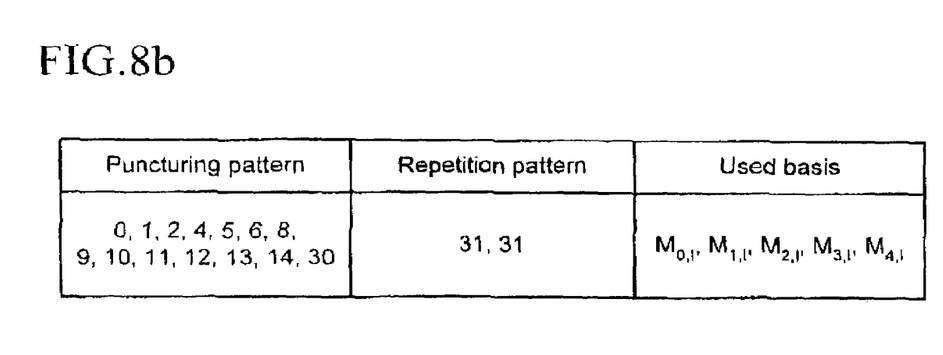
FIG. 8b is a table showing a puncturing pattern, repetition pattern, and used basis adapted to the encoder of FIG. 8b.

FIG. 8a is a block diagram illustrating an encoder for generating (20, 5) code according to a second embodiment of the present invention and FIG. 8b is a table for illustrating how the encoder of FIG. 8a generate the (20, 5) code.

Referring to FIG. 8a and FIG. 8b, the encoder linearly combines 5 inputted information bits with basis sequences so as to generate a (32, 5) expurgated TFCI code. The expurgated TFCI code of 32 bit length is punctured by 14 bits in a puncturing pattern (0, 1, 2, 4, 5, 6, 8, 9, 10, 11, 12, 13, 14, and $30^{th}$ bits) and the $31^{st}$ bit is repeated two times such that the code word of 20 bit length is obtained. The basis sequences generated according to the second embodiment of the present invention are as following in table 5. In other aspect of the second embodiment is to construct basis sequences by extending from (16, 5) TFCI code to the basis sequence of table 5.

TABLE 5

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| . | . | . | . | . | . |
| . | . | . | . | . | . |
| . | . | . | . | . | . |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 1 | 0 |
| 19 | 0 | 0 | 1 | 0 | 0 |

Each of the basis sequences according to the second embodiment can be expressed as follows:
$M_{i,0}$=10101010101010100000
$M_{i,1}$=01100110011001100000
$M_{i,2}$=00011110000111100001
$M_{i,3}$=00000001111111100010
$M_{i,4}$=11111111111111111100

Figure 9A:
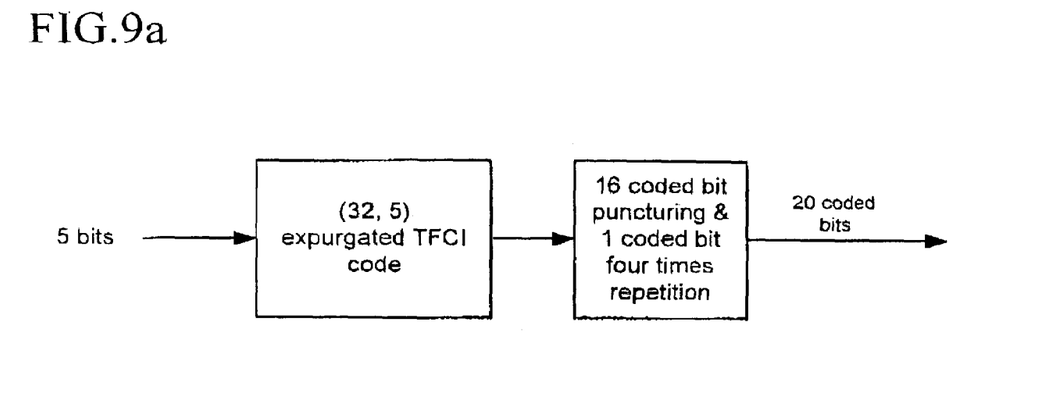
FIG. 9a is a schematic block diagram illustrating an encoder for generating (20, 5) CQI code according to a third embodiment of the present invention.
Figure 9B:
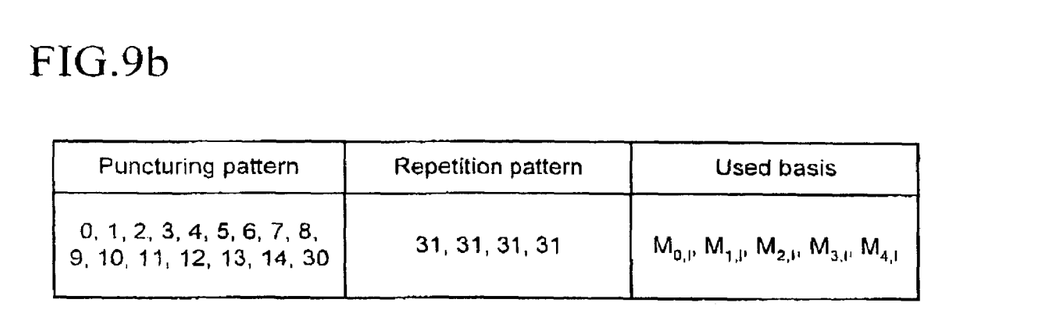

FIG. 9a is a block diagram illustrating an encoder for generating (20, 5) code according to a third embodiment of the present invention and FIG. 9b is a table for illustrating how the encoder of FIG. 9a generate the (20, 5) code.

Referring to FIG. 9a and FIG. 9b, the encoder linearly combines 5 inputted information bits with basis sequences so as to generate a (32, 5) expurgated TFCI code. The expurgated TFCI code of 32 bit length is punctured by 16 bits in a puncturing pattern (0, 1, 2, 3, 4, 5, 6, 7, 8, 9, 10, 11, 12, 13, 14, and $30^{th}$ bits) in order to maximize the system throughput and the $31^{st}$ bit is repeated 4 times in order to maximize the system throughput such that the code word of 20 bit length is obtained. The basis sequences generated according to the third embodiment of the present invention are as following in table 6.

TABLE 6

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| . | . | . | . | . | . |
| . | . | . | . | . | . |
| . | . | . | . | . | . |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 |

Each of the basis sequences according to the third embodiment can be expressed as follows:

$M_{i,0}$=10101010101010100000
$M_{i,1}$=01100110011001100000
$M_{i,2}$=00011110000111100000
$M_{i,3}$=00000001111111100000
$M_{i,4}$=11111111111111111111

In other aspect of the third embodiment, the channel quality information (CQI) coding method comprises (a) obtaining first basis sequences from (16, 5) TFCI code, (b) extending basis sequences to (20, 5) CQI code in a predetermined pattern in order to maximize system throughput, (c) encoding 5 information bits into CQI codes using a second basis sequences generated through (a) and (b). The second extended basis sequences are the same as table 6.

In other aspect of the third embodiment, the channel quality information (CQI) coding method comprises (a) encoding 5 information bits into (16, 5) TFCI codes using (16, 5) TFCI basis sequences (b) repeating the MOB of information bits 4 times.

To support the superiority of the CQI coding schemes of the present invention to the conventional ones, the CQI coding schemes of the embodiments and the conventional ones were simulated and compared with respect to BER, RMS error, and system throughput for selecting optimum CQI coding scheme. Since there is a trade-off between BER and RMS error, the system throughput is considered as a criterion. For simplification, the conventional CQI coding schemes characterized in table 2 and table 3 are referred as C1 and C2.

In the simulations result, the order of the BER performance as follows.

C1>embodiment 1>embodiment 2>C2>embodiment 3
(←better , , , worse→)

The performance gap between the worst and the best is approximately 0.5 dB at BER $10^{-5}$.

In order to measure the unequal error protection capability, the root-mean-square (RMS) error as the criterion is introduced. The RMS error means the root mean square of difference between transmitted codewords and received codewords. The order of the RMS error reduction performance is as follows.

Embodiment 3>C2>embodiment 2>embodiment 1>C1
(←better , , , worse→)

The performance gap between the worst and the best is approximately 1.5 at −3 dB EbNo/Slot.

The system throughput is calculated using simplified system level simulation. And the conventional analytic system level simulator and uplink CQI coding schemes are joined. With combined system level simulation and uplink CQI coding, the BER and RMS error are considered at the same time. The throughput of BER performance is as follows.

Embodiment 3>C2>embodiment 2>embodiment 1>C1
(←better , , , worse→)

The performance gap between the worst and the best is approximately 79 kbps at 3 dB.

In the present invention, the CQI coding schemes are classified with respect to the extended parts of the basis sequence tables and the system throughput is introduced as a criterion for evaluating the CQI coding schemes because there is a trade-off between BER and RMS error. Moreover, during the system throughput simulation, both BER and RMS error effect are already considered together. Also, since HSDPA system has been designed in order to increase the system throughput, the third embodiment of the present invention, which shows the best system throughput in the simulation, can be the optimum CQI coding scheme for HS-DPCCH.

While this invention has been described in connection with what is presently considered to be the most practical and preferred embodiment, it is to be understood that the invention is not limited to the disclosed embodiments, but, on the contrary, is intended to cover various modifications and equivalent arrangements included within the sprit and scope of the appended claims.

What is claimed is:

1. A method of coding channel quality information (CQI), comprising the steps of:
providing information bits, $a_0$, $a_1$, $a_2$, $a_3$, and $a_4$;
providing five basis sequences $M_{i,n}$ for a (20,5) CQI code;
encoding the information bits by combining the information bits with the basis sequences; and
generating a 20-bit codeword,
wherein the basis sequences $M_{i,n}$ are defined as:

| I | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1. |

2. The method of claim 1, wherein the (20,5) CQI code is obtained from a (16,5) TFCI code comprising five 16-bit basis sequences, by extending each 16-bit basis sequence by repeating a respective last basis sequence bit four times.

3. The method of claim 1, wherein the (20,5) CQI code is obtained from a (32,5) expurgated TFCI code comprising five 32-bit basis sequences, by puncturing each 32-bit basis sequence by 16 bits in a predetermined puncturing pattern and repeating a respective last basis sequence bit four times.

4. The method of claim 1, wherein the combination is a linear combination.

5. The method of claim 1, wherein the codeword bits, $b_i$, are given by:

$$b_i = \sum_{n=0}^{4} (a_n \times M_{i,n}) \bmod 2, \text{ where } i = 0, \ldots, 19.$$

6. A method of coding channel quality information (CQI), comprising the steps of:
   a) providing information bits, $a_0$, $a_1$, $a_2$, $a_3$, and $a_4$;
   b) providing five basis sequences Mi,n for a TFCI code;
   c) encoding the information bits by combining the information bits with the basis sequences;
   d) generating an intermediate codeword; and
   e) adding a further bit repeated four times to generate a 20-bit codeword.

7. The method of claim 6, wherein the TFCI code is a (16,5) TFCI code and the intermediate codeword comprises 16 bits.

8. The method of claim 6, wherein the TFCI code is a (32,5) expurgated TFCI code and the intermediate codeword comprises 32 bits, the method further comprising the step of puncturing the 32-bit intermediate codeword by 16 bits in a predetermined puncturing pattern prior to sep (e).

9. The method of claim 6, wherein the further bit repeated four times is one of the information bits.

10. The method of claim 9, wherein the further bit is the most significant bit (MOB).

11. The method of claim 6, wherein the further bit repeated four times is a bit from the intermediate codeword.

12. The method of claim 11, wherein the further bit is a last bit of the intermediate codeword.

13. The method of claim 6, wherein the 20-bit codeword is the same as a codeword generated using basis sequences $M_{i,n}$, defined as:

| I | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1. |

14. A wireless communications system, comprising:
   a user apparatus; and
   a wireless communications network, comprising a base station interface between the user apparatus and the communications network, the user apparatus comprising an encoder arranged to provide channel quality information (CQI) to the base station in the form of a 20-bit codeword, the encoder being arranged to generate the codeword by receiving information bits, $a_0$, $a_1$, $a_2$, $a_3$, and $a_4$, and using five basis sequences, $M_{i,n}$, to encode the information bits by combining the information bits with the basis sequences, wherein the basis sequences $M_{i,n}$ are defined as:

| I | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 1 | 0 | 0 | 0 | 1 |
| 16 | 0 | 1 | 0 | 0 | 1 |
| 17 | 1 | 1 | 0 | 0 | 1 |
| 18 | 0 | 0 | 1 | 0 | 1 |
| 19 | 1 | 0 | 1 | 0 | 1 |
| 20 | 0 | 1 | 1 | 0 | 1 |
| 21 | 1 | 1 | 1 | 0 | 1 |
| 22 | 0 | 0 | 0 | 1 | 1 |
| 23 | 1 | 0 | 0 | 1 | 1 |
| 24 | 0 | 1 | 0 | 1 | 1 |
| 25 | 1 | 1 | 0 | 1 | 1 |
| 26 | 0 | 0 | 1 | 1 | 1 |
| 27 | 1 | 0 | 1 | 1 | 1 |
| 28 | 0 | 1 | 1 | 1 | 1 |
| 29 | 1 | 1 | 1 | 1 | 1 |
| 30 | 0 | 0 | 0 | 0 | 0 |
| 31 | 0 | 0 | 0 | 0 | 1. |

15. A method of coding information regarding a channel, comprising:
   providing information bits of $a_0$, $a_1$, $a_2$, $a_3$, and $a_4$;
   encoding the information bits using a (20, 5) code; and
   providing output code words of 20 bits as a result of the encoding step, wherein the (20, 5) code is a prescribed combination of 5 basis sequences $M_{i,n}$ as defined as follows:

| I | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |

-continued

| I | $M_{i,0}$ | $M_{i,1}$ | $M_{i,2}$ | $M_{i,3}$ | $M_{i,4}$ |
|---|---|---|---|---|---|
| 18 | 0 | 0 | 0 | 0 | 1 |
| 19 | 0 | 0 | 0 | 0 | 1. |

16. The method of claim 15, wherein output code word bits $b_i$ are based on $$b_i = \sum_{n=0}^{4} (a_n \times M_{i,n}) \bmod 2$$

where $i = 0, \ldots, 19$.

17. The method of claim 16, wherein the prescribed combination is a linear combination.

18. The method of claim 15, wherein the information is channel quality information.

19. A method of coding information regarding a channel, comprising:
providing information bits of $a_0, a_1, a_2, a_3,$ and $a_4$;
providing five basis sequences Mi,n for a (20, 5) code
encoding the information bits by Linear combination of the information bits with the basis sequences; and
providing output code words of 20 bits as a result of the encoding step, wherein the (20, 5) code is obtained from a (16, 5) TFCI code comprising five 16-bit basis sequences, by extending each 16-bit basis sequence by repeating a further respective basis sequence bit four times.

20. The method of claim 19, wherein the (20, 5) code is as follows:

| I | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1. |

21. The method of claim 19, wherein the further respective basis sequence bit is a respective last basis sequence bit.

22. The method of claim 19, wherein the further respective basis sequence bit is a respective most significant basis sequence bit.

23. The method of claim 19, wherein output code word bits $b_i$ are based on $$b_i = \sum_{n=0}^{4} (a_n \times M_{i,n}) \bmod 2$$

where $i = 0, \ldots, 19$.

24. A method of coding information regarding a channel, comprising:
providing information bits of $a_0, a_1, a_2, a_3,$ and $a_4$;
providing five basis sequences Mi,n for a (20, 5) code; and
encoding the information bits by linear combination of the information bits with the basis sequences;
wherein the (20, 5) code is obtained from a (32, 5) expurgated TFCI code comprising five 32-bit basis sequences, by puncturing each 32-bit basis sequence by 16 bits in a predetermined puncturing pattern and repeating a further respective basis sequence bit four times.

25. The method of claim 24, wherein the (20, 5) code is as follows:

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1. |

26. The method of claim 24, wherein the further respective basis sequence bit is a respective last basis sequence bit.

27. The method of claim 24, wherein the further respective basis sequence bit is a respective most significant basis sequence bit.

28. The method of claim 24, wherein output code word bits $b_i$ are based on $$b_i = \sum_{n=0}^{4} (a_n \times M_{i,n}) \bmod 2$$

where $i = 0, \ldots, 19$.

* * * * *

UNITED STATES PATENT AND TRADEMARK OFFICE
CERTIFICATE OF CORRECTION

PATENT NO. : 7,319,718 B2
APPLICATION NO. : 10/365498
DATED : January 15, 2008
INVENTOR(S) : Dong-Wook Roh, Min-Seok Oh and Joon Kui Ahn

It is certified that error appears in the above-identified patent and that said Letters Patent is hereby corrected as shown below:

Correct claim 14, appearing at column 13, line 61 through column 14, line 38 by deleting the following lines from the table.

| I | $M_{i,0}$ | $M_{i,1}$ | $M_{i,2}$ | $M_{i,3}$ | $M_{i,4}$ |
|---|---|---|---|---|---|
| "20 | 0 | 1 | 1 | 0 | 1 |
| 21 | 1 | 1 | 1 | 0 | 1 |
| 22 | 0 | 0 | 0 | 1 | 1 |
| 23 | 1 | 0 | 0 | 1 | 1 |
| 24 | 0 | 1 | 0 | 1 | 1 |
| 25 | 1 | 1 | 0 | 1 | 1 |
| 26 | 0 | 0 | 1 | 1 | 1 |
| 27 | 1 | 0 | 1 | 1 | 1 |
| 28 | 0 | 1 | 1 | 1 | 1 |
| 29 | 1 | 1 | 1 | 1 | 1 |
| 30 | 0 | 0 | 0 | 0 | 0 |
| 31 | 0 | 0 | 0 | 0 | 1" |

Signed and Sealed this

Twenty-seventh Day of October, 2009

David J. Kappos
*Director of the United States Patent and Trademark Office*